United States Patent
Wilsher et al.

(10) Patent No.: US 9,317,789 B2
(45) Date of Patent: Apr. 19, 2016

(54) SYSTEM AND METHOD FOR CONTROLLING POWER MODES IN PRINTERS, PHOTOCOPIERS, AND MULTI-FUNCTION DEVICES

(71) Applicant: Xerox Corporation, Norwalk, CT (US)

(72) Inventors: Michael John Wilsher, Letchworth (GB); Derek William Judd, Stevenage (GB); Daniel Vila Marquez, Welwyn Garden City (GB)

(73) Assignee: Xerox Corporation, Norwalk, CT (US)

( * ) Notice: Subject to any disclaimer, the term of this patent is extended or adjusted under 35 U.S.C. 154(b) by 58 days.

(21) Appl. No.: 14/102,178

(22) Filed: Dec. 10, 2013

(65) Prior Publication Data

US 2015/0161493 A1 Jun. 11, 2015

(51) Int. Cl.
*G06K 15/00* (2006.01)
*G06K 15/14* (2006.01)
*G03G 15/00* (2006.01)

(52) U.S. Cl.
CPC .......... *G06K 15/406* (2013.01); *G03G 15/5004* (2013.01); *G03G 15/5091* (2013.01); *G06K 15/005* (2013.01); *G06K 15/14* (2013.01); *G03G 15/5016* (2013.01)

(58) Field of Classification Search
None
See application file for complete search history.

(56) References Cited

U.S. PATENT DOCUMENTS

| | | | |
|---|---|---|---|
| 6,026,258 A * | 2/2000 | Fresk et al. | 399/87 |
| 7,794,040 B2 | 9/2010 | Snyder | |
| 8,046,617 B2 | 10/2011 | Fleck et al. | |
| 8,228,520 B2 | 7/2012 | Snyder | |
| 8,456,669 B2 | 6/2013 | Bisset | |
| 2007/0103523 A1* | 5/2007 | Snyder et al. | 347/88 |
| 2007/0296778 A1* | 12/2007 | Snyder | 347/88 |
| 2008/0288802 A1* | 11/2008 | Fleck et al. | 713/324 |
| 2009/0271111 A1* | 10/2009 | Takanashi et al. | 701/209 |
| 2010/0128301 A1* | 5/2010 | Bisset | 358/1.15 |
| 2010/0295808 A1* | 11/2010 | Seo et al. | 345/173 |
| 2012/0252402 A1* | 10/2012 | Jung | 455/405 |
| 2013/0120779 A1* | 5/2013 | Baba et al. | 358/1.13 |

* cited by examiner

*Primary Examiner* — Mohammad Ghayour
*Assistant Examiner* — Pawandeep Dhingra
(74) *Attorney, Agent, or Firm* — Maginot Moore & Beck LLP

(57) ABSTRACT

A printer, copier, or multi-function printing device (MFP) operates in a reduced power mode in which a controller identifies a path of motion of an object external to the printer with reference to signals from a proximity sensor housed in the printer. The controller connects one or more components to electric power to transition to an elevated power operating mode if the identified path corresponds to a path history that is stored in a memory of paths of object paths that have occurred prior to operation of the printer, copier or MFP. The activation of the components reduces a delay that an operator perceives as the printer, copier or MFP transitions from the reduced power operating mode to the elevated power operating mode thus significantly reducing power consumption during operation.

20 Claims, 3 Drawing Sheets

SYSTEM AND METHOD FOR CONTROLLING POWER MODES IN PRINTERS, PHOTOCOPIERS, AND MULTI-FUNCTION DEVICES

TECHNICAL FIELD

This disclosure relates generally to systems and methods for controlling the power consumption in printers and, more particularly, to systems and methods for changing the operating mode of a printer, photocopier, or other multifunction printing device (MFP) based on the movement of an operator in a region around the printer, photocopier, or MFP.

BACKGROUND

Reducing the consumption of electrical energy during operation of printers is of prime interest to individuals and organizations that operate the printers and to regulatory agencies that set standards governing the energy efficiency of printers and other products. Many existing printers include reduced power operating modes, which are sometimes referred to as "standby" modes, where the printer deactivates one or more components to reduce energy usage while the printer is not in use. In the standby mode, the printer is not completely deactivated, but the printer consumes a small amount of power to receive commands from operators without requiring the operators to turn the printer on from the deactivated power state.

While the standby power modes for existing printers help to reduce the power consumption of the printers, many printers experience a delay in the transition from a reduced power operating mode to an elevated power operating mode in which the printer can perform operations such as printing documents. For example, in many xerographic printers an electric heater is activated to heat a fuser roller to an elevated temperature for printing. The heating process takes several seconds and the printer cannot perform a printing process until the fuser reaches an acceptable operating temperature. During a "walk up" printing operation where an operator is physically present at the printer, the time required to transition to the elevated power operating mode delays the printing operation. Consequently, improvements to the printers that enable the printers to operate in reduced power modes while also responding to operator commands with reduced delays would be beneficial.

SUMMARY

In one embodiment, a method for operating a printer in different power consumption modes based on the movement of objects in an environment around the printer has been developed. The method includes decoupling with a controller a graphical display device in the printer and at least one other component in the printer from electrical power while a first proximity sensor in the printer is operatively connected by the controller to electrical power, identifying with the controller a path of movement of an object in proximity to the printer with reference to a plurality signals generated by the first proximity sensor, and operatively connecting with the controller the graphical display device in the printer and the at least one other component in the printer to electrical power in response to the controller detecting that the identified path of movement of the object corresponds to data for at least one object path in a plurality of object paths stored in a memory in the printer, the at least one object path corresponding to use of the printer.

In another embodiment, a printer that operates in different power consumption modes based on the movement of objects in an environment around the printer has been developed. The printer includes a housing, a first proximity sensor supported by the housing and configured to sense movement of objects external to the housing, a print unit supported by the housing, a graphical display device supported by the housing, an input device supported by the housing, a memory, and a controller operatively connected to the first proximity sensor, print unit, graphical display device, input device, and the memory. The controller is configured to decouple the graphical display device and at least one other component in the print unit from electrical power while the first proximity sensor is operatively connected to electrical power, identify a path of movement of an object in proximity to the printer with reference to a plurality signals generated by the first proximity sensor, and operatively connect the graphical display device and the at least one other component in the print unit to electrical power in response to detection of a path of movement of the object that corresponds to data for at least one object path in a plurality of object paths stored in the memory, the at least one object path corresponding to use of the printer.

BRIEF DESCRIPTION OF THE DRAWINGS

The foregoing aspects and other features of a printer that operates in different power modes are explained in the following description, taken in connection with the accompanying drawings.

DETAILED DESCRIPTION

Figure 1:
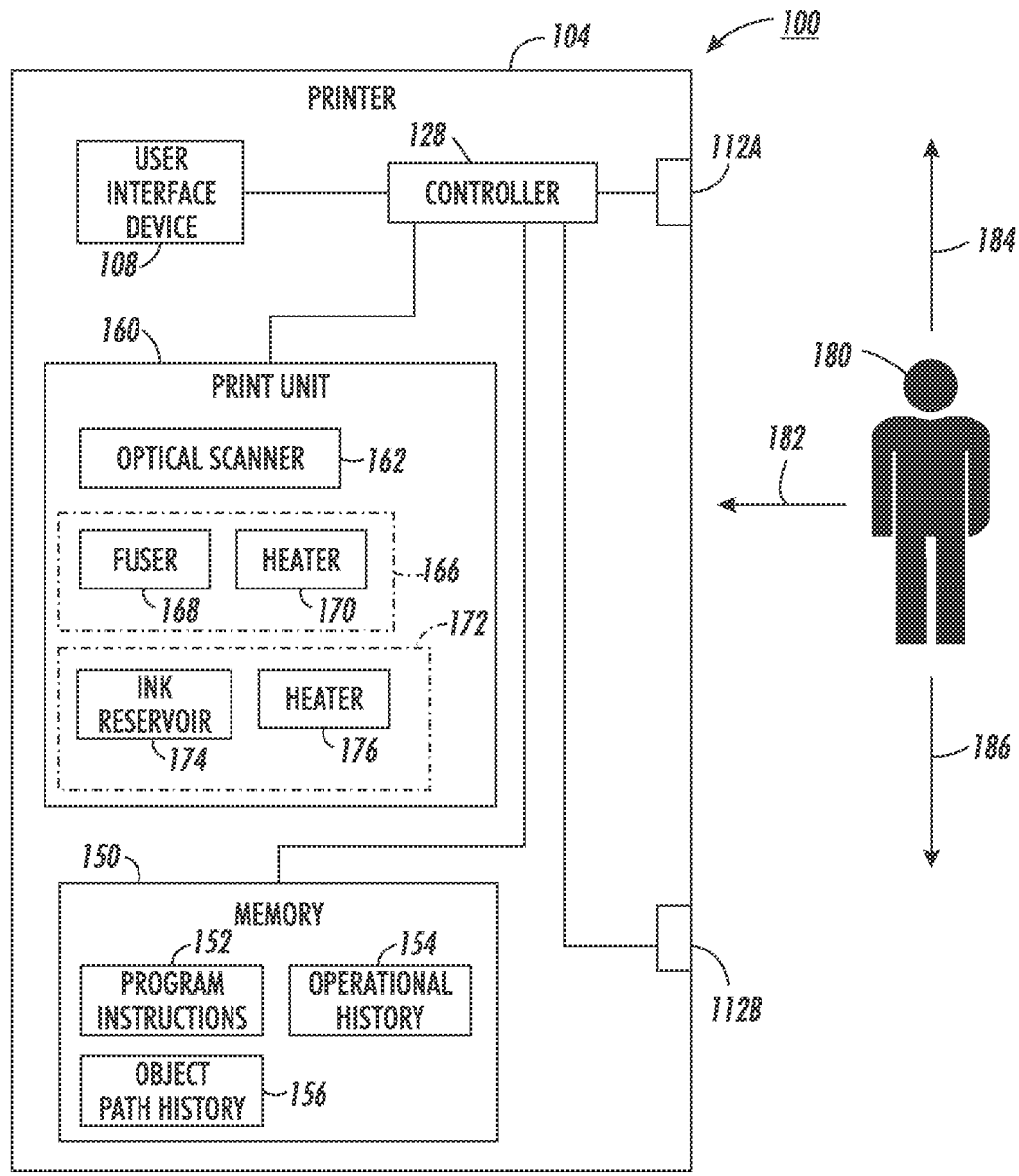
FIG. 1 is a schematic diagram of a printer that detects movements of objects in an environment around the printer to control the transition from a reduced power mode to an elevated power mode based on object movement paths.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that produces images with colorants on media, such as digital copiers, digital scanners, bookmaking machines, facsimile machines, multi-function printing device (MFP), or the like.

FIG. 1 is a schematic diagram of a printer 100 and an environment around the printer 100 that includes moving objects such as an operator 180. The printer 100 includes a housing 104 that supports a user interface device 108, proximity sensors 112A and 112B, controller 128, memory 150, and a print unit 160. The controller 128 is operatively connected to the user interface device 108, proximity sensors 112A and 112B, the memory 150, and the print unit 160. The user interface device 108 includes a graphical display device, such as a liquid crystal display (LCD) screen, and one or more input devices including tactile input devices such as buttons or a touchscreen input that is integrated with the graphical display device. The user interface device 108 provides a graphical user interface (GUI) or other suitable interface to enable the operator 180 to enter requests for different operations that the printer 100 should perform. Because the operator 180 is physically proximate to the printer 100 when using the user interface device 108, the user interface device 108 receives so-called "walk up" commands from the operator 180. As is well known in the art, the printer 100 consumes electrical power during operation. The printer 100 receives power from an electrical utility grid (not shown), although some printer embodiments can receive electrical power from batteries or other suitable electrical power generation sources.

The print unit of FIG. 1 160 includes an optical scanner 162 for document scanning and photocopying operations, although some printer configurations do not include an optical scanning device. The optical scanner 162 typically includes a light source, such as a fluorescent light source, one or more optical scanning elements, and an electrical motor that consume electrical power. During a reduced power consumption mode, the controller 128 decouples the optical scanner from the electric power source to reduce the electrical power consumption of the printer 100. As used herein, the terms "decouple" and "decoupling" refer to disconnection of a component from electrical power or operation of a component in an operating mode with reduced power consumption that enables a printer to operate with reduced power consumption. The print unit 160 also includes illustrative examples of components that consume electrical power in a print engine including a fuser unit 166 that is commonly found in xerographic printers and a phase-change ink reservoir unit 172 that is commonly found in inkjet or solid ink printers. Consequently, most commercially available printers only incorporate one of the fuser unit 166 and the ink reservoir unit 172. The fuser unit 166 includes a fuser roller 168 and a heater 170. The heater 170 is operatively connected to the fuser roller and heats the fuser roller to enable the fuser roller to fuse toner particles to a print medium in a xerographic printer. The ink reservoir unit 172 includes an ink reservoir 174 that stores a phase-change ink and a heater 176 that is operatively connected to the reservoir 174. The phase-change ink in the reservoir 174 is solid at room temperature, and the heater 176 heats the ink until the ink melts into a liquid phase for a printing operation. Both of the heaters 170 and 176 are electric heaters that consume electrical power during operation, and the controller 128 decouples the heaters from electric power when the printer 100 operates in a reduced power consumption mode. The printer 100 operates with a delay from the initial activation of the heaters 170 and 176 until the printer 100 is ready to perform printing operations to provide time for the fuser 168 and ink reservoir 174, respectively, to reach predetermined operating temperatures. As described in more detail below, the controller 128 decouples components in the print unit 160 from electric power to reduce the power consumption, and operatively connects the components to electric power in anticipation of commands from the operator 180 if the printer 100 identifies that the operator 180 is moving in a path that is associated with operation of the printer 100.

In the printer 100, the controller 128 is a digital processing device that includes one or more microprocessors, microcontrollers, digital signal processors (DSPs), application specific integrated circuits (ASICs), field programmable gate arrays (FPGAs), and the like. The controller 128 executes stored program instructions 152 that are stored in the memory 150. The memory 150 includes both non-volatile data storage devices, such as solid-state devices, magnetic disks, and other data storage devices that retain data in the absence of electrical power, and volatile data storage devices such as static and dynamic random access memory (RAM). As with other components in the printer 100, the controller 128 operates with different levels of power consumption in different operating modes in the printer 100. For example, in a standby operating mode the controller 128 reduces the operating clock speed or deactivates one or more processing units to monitor motion signals from the proximity sensors 112A and 112B in a reduced power operating mode. In one embodiment, the printer 100 consumes approximately 2.5 watts in the reduced power operating mode. Embodiments which contain more than two proximity sensors and provide additional comprehension of external activity are also envisaged.

In the printer 100, the memory 150 stores operational history data 154 and object path history data 156 in addition to storing the program instruction data 152. The operational history data 154 include records of one or more previous operations that the printer 100 has performed in response to commands that one or more operators enter through the user interface device 108. The object path history data 156 stores records corresponding to the paths of motion for different objects that are detected by the proximity sensors 112A and 112B. As described below, in one embodiment the object path history data 156 include clusters of identified paths that are observed shortly before an operator enters a command using the user interface device 108 and other paths that do not precede activation of the user interface device 108.

In the embodiment of FIG. 1, the printer 100 includes two proximity sensors 112A and 112B. The proximity sensors 112A and 112B are placed in the housing 104 to with a field of view that includes a region around the printer 100, including the region where an operator would approach the printer 100 to use the user interface device 108. In one embodiment, each of the proximity sensors is an infrared proximity sensor such as the TSSP4P38 or TSSP6P38 model sensors from Vishay Intertechnology, Inc. of Malvern, Pa. Each of the sensors 112A and 112B generates a signal when an object comes into view of the sensor. Other types of proximity sensor such as ultrasonic, capacitive, video and image analysis etc. are also envisaged. The amplitude of the signal is inversely related to the distance between the object and the sensor. The controller 128 uses the signals from both sensors 112A and 112B to identify the position of the object relative to the housing 104 using, for example, triangulation or other range finding techniques. While FIG. 1 depicts two sensors 112A and 112B, alternative embodiments use additional sensors to improve the accuracy of detection and the sensors can be arranged on multiple sides of the housing 104 to increase the field of view around the printer 100. In another embodiment, the housing 104 incorporates a single proximity sensor that is configured to track the movement of objects along a single axis or multiple axes around the printer 100. The controller 128 receives signals from the sensors 112A and 112B at regular intervals to identify a path of motion for an object as the object moves in the environment around the printer 100. In alternative embodiments, active range finding sensors including light detection and ranging (LIDAR) sensors, ultrasonic range finding sensors, and depth cameras are used to identify the range and motion of objects around the printer 100, including the motion of the operator 180. The effective maximum detection ranges for various sensor embodiments are typically from 2 meters up to 10 meters, although longer range sensors can be used.

During operation, the printer 100 operates in a reduced power mode where some or all of the components in the printer 100 that consume large amounts of electrical power are decoupled from the electrical power source. For example, components in the print unit 160 including the optical scanner 162, and the heaters 170 and 176 in either the fuser unit 166 or ink reservoir unit 172, and a backlight in the display device of the user interface 108, respectively, are decoupled from electric power to reduce electrical power consumption of the printer 100. The proximity sensors 112A and 112B detect motion of objects in the environment around the printer 100. The controller 128 identifies if the path of motion for an object is associated with the path history data 156 that corresponds to a path of an operator who is approaching the printer 100 to perform an operation, or a path of an operator who is moving past the printer 100. For example, in FIG. 1, the operator 180 moves in path 182 to approach the printer 100 and potentially use the user interface device 108, while the operator moves on paths 184 and 186 past the printer 100 without using the printer 100. The controller 128 activates the graphical display device in the user interface 108 and optionally activates other components in the print unit 160 in response to an identified path that indicates the operator 180 is moving on a path that likely precedes an operation with the printer 100. The printer 100 activates one or more components in anticipation of a command from the operator 180 to reduce or eliminate a delay that the operator 180 experiences as the printer 100 transitions from a reduced power operating mode to an elevated power operating mode. Thus the user experience is similar to a typical low power mode, but the printer is in almost a sleep state using significantly less power.

Figure 2:
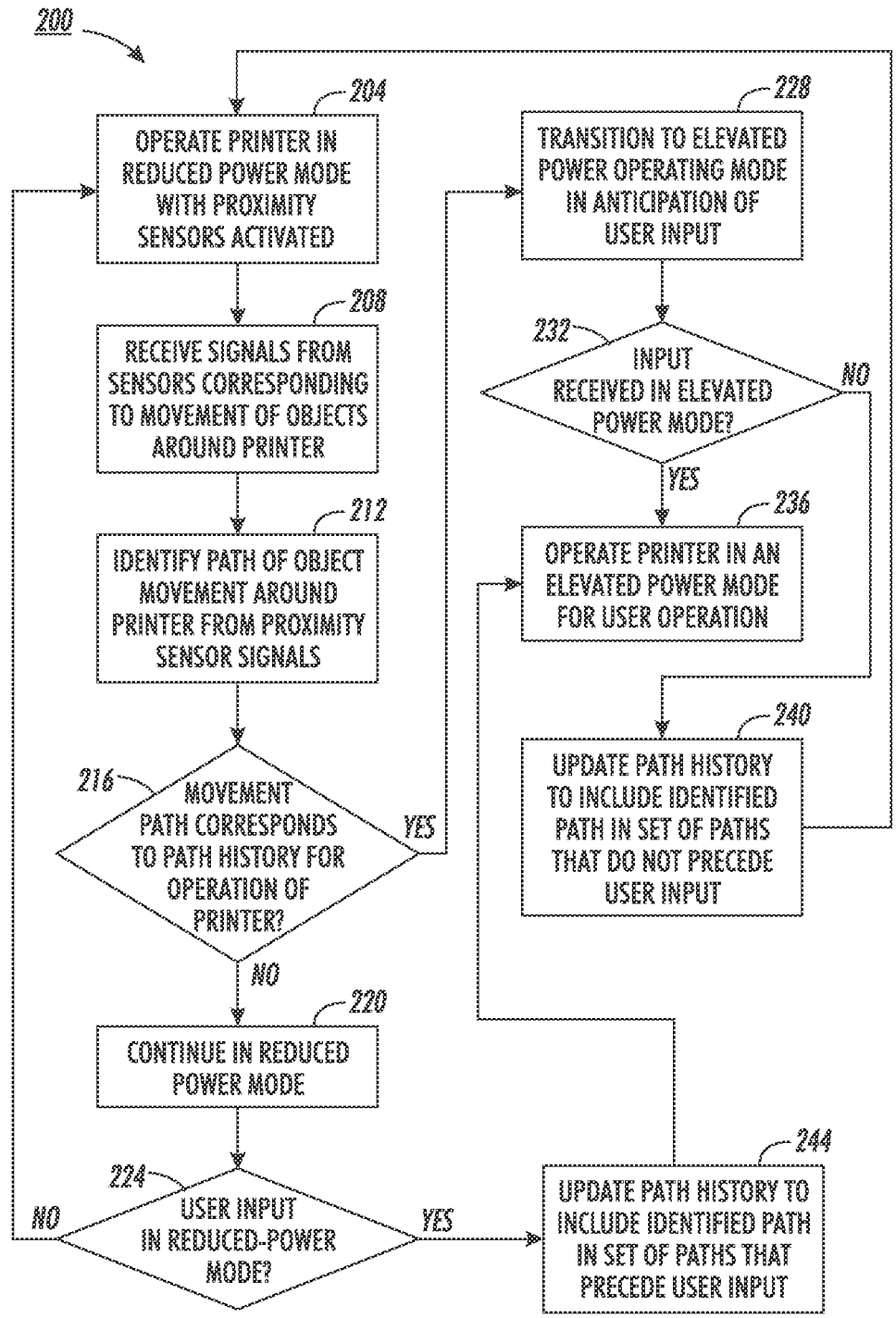
FIG. 2 is a block diagram of a process for operating a printer to transition between operating modes that consume different levels of electrical power consumption based on movement of objects around the printer.

FIG. 2 depicts a process 200 for operation of a printer that transitions between different operating modes that consume different levels of electrical power. In the description below, a reference to the process 200 performing an action or function refers to the execution of stored program instructions by a digital controller, such as the controller 128, to perform the action or function in conjunction with other components in a printer. Process 200 is described in conjunction with the printer 100 of FIG. 1 for illustrative purposes.

Process 200 begins as the printer 100 operates in a reduced power mode (block 204). In the reduced power mode, the controller 128 decouples some of the components in the printer 100 from electric power, but other components, which include the proximity sensors 112A and 112B, remain activated. For example, the controller 128 decouples the graphical display in the user interface device 108 and the print unit 160 from electric power to reduce the consumption of electrical power when the printer 100 is not in operation. The digital controller 128 and memory 150 also operate in a reduced power consumption mode to enable the controller 128 to monitor signals that are received from the proximity sensors 112A and 112B. In one embodiment, the printer 100 consumes approximately 2.5 watts of electrical power in the reduced power mode while the proximity sensors 112A and 112B are activated. While not depicted in FIG. 2, the printer 100 is optionally configured to operate in other modes in which the sensors 112A and 112B are decoupled from electric power and the printer consumes less power, such as a lower-power standby mode that occurs after a prolonged period of inactivity or during scheduled time periods when the printer 100 is typically not expected to be in operation.

Process 200 continues as the controller 128 receives signals from the proximity sensors 112A and 112B that correspond to movement of an object outside the housing 104 of the printer 100 (block 208). As described above, the signals from the proximity sensors 112A and 112B can indicate a range to the moving object and optionally indicate a bearing to the object. Some sensor embodiments are configured to identify the range to an object directly, while the controller 128 infers the range to an object using the relative amplitude of signals from the proximity sensors in other embodiments. The controller 128 uses triangulation and other techniques that are known the art to integrate the signals from multiple sensors together to identify a position of the object relative to the printer 100.

During process 200, the controller 128 identifies a path of movement of the object over time through the field of view of the sensors 112A and 112B using multiple identified positions of the object that change over time (block 212). For example, in FIG. 1, printer 100 identifies the operator 180 as an object that is within the field of view of either or both of the sensors 112A and 112B as the operator 180 moves in the environment around the printer 100. For example, the arrows 182, 184, and 186 indicate a few possible paths of motion for the operator 180. Of course, the path of the operator 180 is not necessarily a straight line, and the controller 128 identifies both straight and curved paths of objects that move through the field of view of the proximity sensors 112A and 112B.

Process 200 continues as the controller 128 compares the identified path of the object to data corresponding to a plurality of previously observed paths in the object path history data 156 that are stored in the memory 150. The controller 128 identifies if the identified movement path is sufficiently similar to previously identified paths that precede activation of the printer 100 to perform an operation to determine if the printer 100 should transition to an elevated power operating mode (block 216). In one embodiment, the object path history 156 stores two sets of data corresponding to the identified paths of objects that the printer 100 has observed in the past. One set of data in the object path history 156 includes paths that the printer 100 observes within a predetermined time of the printer 100 receiving a command to perform an operation through the graphical display and user interface device 108. For example, the printer 100 identifies a path of movement for the operator 180 as the operator 180 approaches the printer 100 along the path 182 and subsequently enters commands through a touchscreen user interface 108. The controller 128 stores data corresponding to the identified path in the object path history data 156 in association with a path that occurred shortly prior to activation of the printer 100 to perform an action. In some embodiments, the object path history 156 also includes a second set of path data that correspond to paths of objects that move in the environment around the printer 100, but that do not precede input of a command to the printer 100. For example, the operator 180 may often walk past the printer 100 along the paths 184 or 186. The proximity sensors 112A and 112B detect the movement of the operator 180, but the printer 100 does not receive a command through the user interface device 108 within a short time period of movement along these paths.

In one embodiment of the process 200 pre-stored typical paths are used and the controller 128 responds to movement along predetermined paths, taking the printer 100 from the low power to operational state. In another embodiment of the process 200, the controller 128 uses a clustering process to group the data corresponding to data paths in the path history 156 and to determine if a newly identified path corresponds to previously observed paths that precede a user input to operate the printer 100. For example, during use operators often approach the printer 100 using similar paths. The controller 128 uses a clustering process to group the data corresponding to multiple paths into one or more clusters of similar paths. In some instances, the operators follow a single narrow range of paths prior to operating the printer, which generates a single cluster. In other instances, the operators approach the printer 100 from different directions, which produces two or more clusters based on sets of similar paths that the operators take to approach the printer 100 from the different directions. The controller 128 optionally performs the clustering process for the paths that do not precede operation of the printer to assist in identifying object movements that the printer 100 should ignore during operation. The controller 128 uses the clustering process to identify a degree of similarity between the observed path of the object and the clusters of paths in the path history data 156. If the similarity between the observed path and one of the clusters in the path history data 156 exceeds a predetermined threshold, then the controller 128 identifies that the object is moving along a path that has a high likelihood of preceding user input to operate the printer 100. If the similarity level is too low, or if the observed path is more similar to clusters of paths that the path history data 156 indicate do not precede activation of the printer 100, then the controller 128 identifies that the object is moving along a path associated that has a low likelihood of preceding user input to operate the printer 100.

If the controller 128 determines that the identified path of the object is dissimilar to the paths in the path history data 156 that precede activation of the printer 100 (block 216), then the printer 100 continues to operate in the reduced power mode (block 220). In many instances, the printer 100 does not receive user input through the user interface device 108 (block 224) and the process 200 returns to the processing described above with reference to block 204 to continue monitoring for movement of objects around the printer 100 while the printer 100 operates in a reduced power mode. In some instances, the printer 100 receives input through the user interface device 108 while operating in the reduced power mode (block 224). The controller 128 updates the path history data 156 to include the observed path in the set of paths that precede user input (block 244) and activates one or more components in the print unit 160 to perform an operation that the operator 180 requests using the user interface 108 (block 236).

In some circumstances, the controller 128 determines that the identified path of movement corresponds to a cluster of paths in the path history data 156 that correspond to movement of objects around the printer 100 that occur prior to user input through the user interface device 108 (block 216). The controller 128 activates one or more components in the printer 100 to transition the printer into an elevated power operating mode (block 228). The controller 128 activates the components in anticipation of user input before the user provides the input through the user interface device 108. For example, the controller 128 couples the graphical display device in the user interface 108 to electrical power to enable the user interface 108 to display information and receive input once the operator arrives at the printer 100. Additionally, the controller 128 activates components in the printer such as the fuser heater 170 to warm the fuser 168 in a xerographic printer or the ink reservoir heater 176 to heat and melt ink in the ink reservoir in a phase-change ink printer. In printer embodiments that include an optical scanner, the controller 128 optionally activates an optical scanner 162 to prepare for a scanning operation. The controller 128 activates the components to reduce or eliminate any delays that the user would experience if the printer 100 remained in the reduced power operating mode while the operator first operates the user interface device 108. If the operator activates the user interface device 108 while the printer is operating the elevated power consumption mode (block 232) then the printer performs one or more operations based on the user input (block 236). While not expressly depicted in FIG. 2, the printer 100 returns to the reduced power operating mode that is illustrated in block 204 after performing the operations that are requested by the operator through the user interface 108.

In some instances, the printer 100 operates in the elevated power mode until a predetermined timeout occurs without receiving any input from the operator (block 232). If the printer fails to receive input from the operator, then the controller 128 updates the path history data 156 to associate the identified path with a path that did not occur prior to receiving operator input through the user interface 108 (block 240). The controller 128 updates the path clusters that are stored in the memory 150 to improve the accuracy of path identification during subsequent operation of the printer 100. The controller 128 also returns the printer 100 to the reduced power consumption operation mode that is illustrated in block 204 in FIG. 2.

Figure 3:
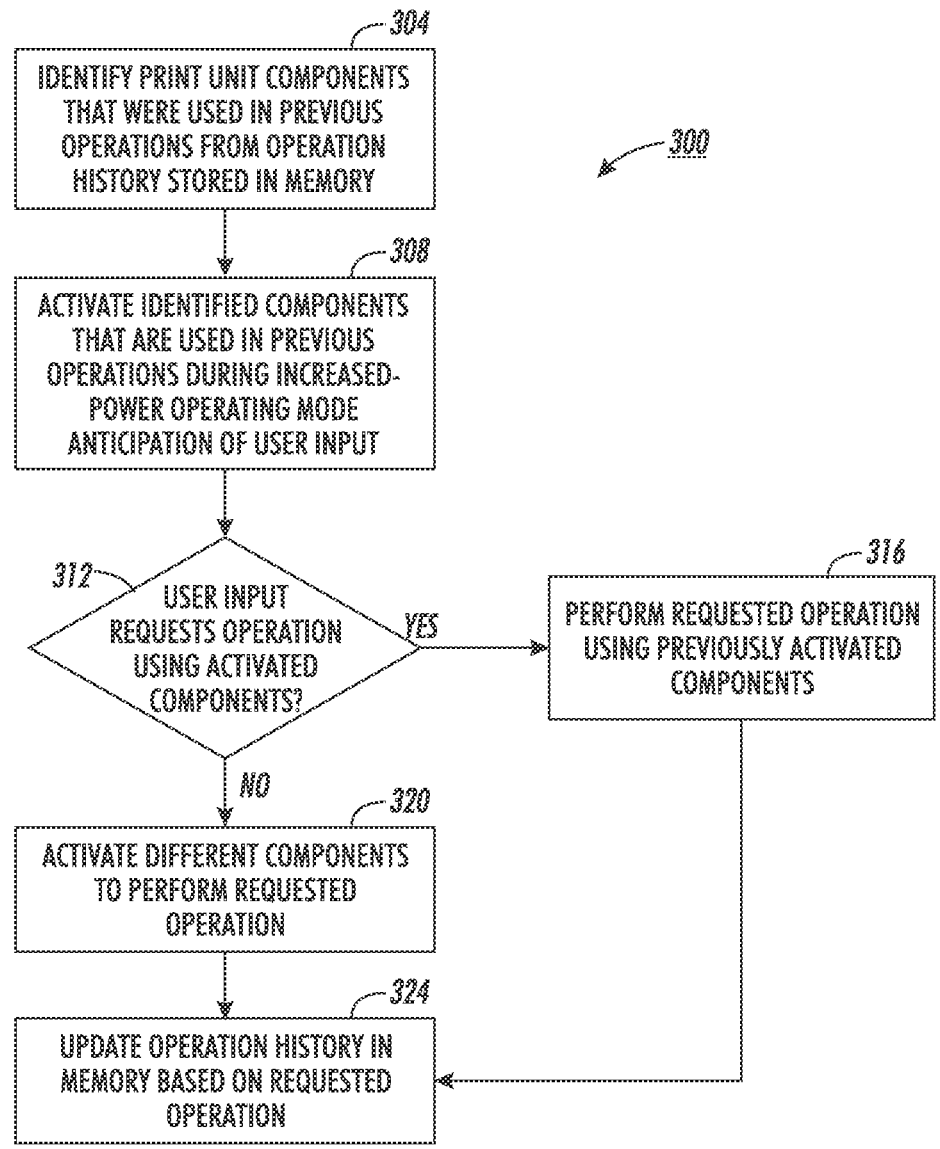
FIG. 3 is a block diagram of a process for operating a printer to selectively activate components in the printer based on an operational history of the printer.

During process 200, the printer 100 operates in a reduced power consumption mode to reduce the consumption of electrical energy when no printing operations are taking place, but to activate one or more components in the printer 100 in anticipation of operator input when the operator approaches the printer 100. In some embodiments, the controller 128 activates selected components in the printer 100 based on an operational history of the printer 100. FIG. 3 depicts a process 300 for operation of the printer to activate only selected components based on the operating history of commands that are received from one or more operators. In the description below, a reference to the process 300 performing an action or function refers to the execution of stored program instructions by a digital controller, such as the controller 128, to perform the action or function in conjunction with other components in a printer. Process 300 is described in conjunction with the printer 100 of FIG. 1 for illustrative purposes. In one embodiment, the controller 128 performs the process 300 in conjunction with the transition to the elevated power operating mode that is described with reference to the processing of block 228 during the process 200.

Process 300 begins as the controller 128 identifies components in the print unit 160 that have been activated during previous operations (block 304). In the printer 100, the operational history data 154 store historical information about the operations that have been performed in response to commands from the operator 180 that are entered through the user interface device 108. In printer configurations that include network connectivity, the operational history data 154 do not include operations that are performed in response to commands that are received from a remote computing device through the network, but instead includes only the commands that are entered through the user interface device 108 when the operator 180 is in physical proximity to the printer 100. In one configuration, the operational history 154 stores the history of operations that have been performed within a predetermined time period (e.g. the previous day, week, month, etc.). In another configuration, the operational history data 154 stores up to a predetermined number of operations that the printer 100 has performed, and the oldest operations are removed from the history once the maximum number has been reached.

Each entry in the operational history identifies an operation with a predetermined set of components that are used in the printer 100 to perform the operation. For example, a photocopying operation uses both the optical scanner 162 and either the fuser assembly 166 or the ink reservoir assembly 172 in xerographic and inkjet printer embodiments, respectively. A printing operation only uses the fuser assembly 166 or ink reservoir assembly 172 in the print unit without activating the optical scanner. A scanning operation may only use the optical scanner 162 to generate digital scanned image data of a document without printing to a print medium.

Process 300 continues as the controller 128 activates components that are used in the previous operations in anticipation of receiving user input through the user interface 108 (block 308). In one embodiment, the controller 128 identifies the most common operation in the operational history data 154 and activates the components that are associated with the most common operation. In one embodiment where the operational history data 154 includes a single entry for the previous operation, the controller 128 activates the same printer components that were used in the previous operation. As described above in the process 200, the controller 128 also activates the display screen and other input devices in the user interface 108 to receive commands from the operator 180.

During process 300, the printer 100 receives input from the operator 180 that specifies an operation that the printer 100 should perform. If the operation that is requested by the user corresponds to the same components that have already been activated (block 312), then the printer performs the requested operation using the activated components (block 316). For example, if the controller 128 activates the optical scanner 162 for a scanning operation based on the operational history data 154, then the printer 100 performs the scanning operation if the operator 180 requests the scan using the user interface device 108. The optical scanner 162 is already activated and the printer 100 performs the operation with minimal delay. If, however, the user input requests an operation that includes components that have not already been activated (block 312), then the printer 100 activates the components that are required to perform the requested operation (block 320). In either case, the printer 100 performs the operation, although the operation may take longer to complete if the activation of components for the operation takes time, such as a warm up time for a fuser unit 166 or ink reservoir unit 172. In either case, the controller 128 updates the operational history data 154 in the memory 150 with a record of the requested operation (block 324).

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method of operating a printer comprising:
   decoupling with a controller a graphical display device in the printer and at least one other component in the printer from electrical power while a first proximity sensor in the printer is operatively connected by the controller to electrical power;
   receiving at the controller a plurality of signals from the first proximity sensor that generates signals corresponding to a position of an object with respect to the printer;
   identifying with the controller a path of movement of the object in proximity to the printer with reference to the plurality of signals generated by the first proximity sensor;
   identifying with the controller a degree of similarity between the identified path of movement for the object and each cluster of object paths in a plurality of object paths stored in a memory, the plurality of object paths stored in the memory includes a plurality of clusters of object paths that precede data being received through the graphical display device and a plurality of clusters of object paths that do not precede data being received through the graphical display device;
   detecting that the identified degree of similarity between the identified path of movement for the object and one cluster of object paths that precedes data being received through the graphical display device exceeds a predetermined threshold; and
   operatively connecting with the controller the graphical display device in the printer and the at least one other component in the printer to electrical power in response to the controller detecting that the degree of similarity between the identified path of movement of the object and the one cluster of object paths that precedes data being received through the graphical display exceeds the predetermined threshold.

2. The method of claim 1, the identification of the path of movement of the object further comprising:
   receiving at the controller a plurality of signals generated by a second proximity sensor that correspond to positions of the object with respect to the printer; and
   identifying with the controller the degree of similarity for the identified path of movement for the object with reference to the plurality signals generated by the first proximity sensor and the plurality of signals generated by a second proximity sensor in the printer, the second sensor being operatively connected to electrical power by the controller.

3. The method of claim 2 further comprising:
   storing with the controller in the plurality of object paths stored in the memory data corresponding to the plurality of signals from the first sensor and the second sensor in association with data being received through the graphical display device in response to the graphical display device associated with the printer receiving data.

4. The method of claim 2 further comprising:
   detecting with the controller that the degree of similarity between the identified path of movement for the object and a cluster of object paths that do not precede data being received through the graphical display device in the plurality of object paths stored in the memory exceeds the predetermined threshold; and
   continuing to operate the printer without operatively connecting the graphical display device in the printer and the at least one other component in the printer to electrical power in response to the controller detecting that the degree of similarity between the identified path of movement for the object and the cluster of object paths that does not precede data being received through the graphical display device exceeds the predetermined threshold.

5. The method of claim 4 further comprising:
   storing with the controller in the plurality of object paths stored in the memory data corresponding to the plurality of signals from the first sensor and the second sensor in association with no data being received through the graphical display device in response to the graphical display device associated with the printer receiving no data within a predetermined time period following detection of the object with the controller.

6. The method of claim 1 further comprising:
   operatively connecting with the controller an electric heater to electrical power in response to the degree of similarity between the identified path of the movement for the object and the cluster of object paths that precede data being received through the graphical display device exceeds the predetermined threshold, the electric heater being operatively connected to a fuser in the printer.

7. The method of claim 1 further comprising:
operatively connecting with the controller an electric heater to electrical power in response to the degree of similarity between the identified path of the movement for the object and the cluster of object paths that precede data being received through the graphical display device, the electric heater being operatively connected to an ink reservoir in the printer.

8. The method of claim 1, further comprising:
identifying a previously performed operation of the printer with reference to operational history data stored in the memory in the printer;
identifying a first component in the printer used in the previously performed operation;
identifying a second component in the printer not used in the previously performed operation, the display device, the at least one other component, the first component, and the second component being different components; and
operatively connecting the first component to electrical power with the controller and leaving the second component decoupled from electrical power.

9. The method of claim 8 wherein the previously performed operation is a scanning operation, the first component is an optical scanner component, and the second component is a heater operatively connected to a fuser in the printer.

10. The method of claim 8 wherein the previously performed operation is a scanning operation, the first component is an optical scanner component, and the second component is a heater operatively connected to an ink reservoir in the printer.

11. A printer comprising:
a housing;
a first proximity sensor supported by the housing and configured to sense movement of objects external to the housing and generate signals corresponding to positions of the objects with respect to the printer;
a print unit supported by the housing;
a graphical display device supported by the housing;
an input device supported by the housing;
a memory; and
a controller operatively connected to the first proximity sensor, print unit, graphical display device, input device, and the memory, the controller being configured to:
decouple the graphical display device and at least one other component in the print unit from electrical power while the first proximity sensor is operatively connected to electrical power;
receive a plurality of signals from the first proximity sensor;
identify a path of movement of an object in proximity to the printer with reference to the plurality signals generated by the first proximity sensor;
identify a degree of similarity between the identified path of movement for the object and each cluster of object paths in a plurality of object paths stored in a memory, the plurality of object paths stored in the memory includes a plurality of clusters of object paths that precede data being received through the graphical display device and a plurality of clusters of object paths that do not precede data being received through the graphical display device;
detect that the identified degree of similarity for the identified path of movement for the object and one cluster of object paths that precede data being received through the graphical display device exceeds a predetermined threshold; and
operatively connect the graphical display device and the at least one other component in the print unit to electrical power in response to detection that the degree of similarity between the identified path of movement for the object and the one cluster of object paths that precede data being received through the graphical display device exceeds the predetermined threshold.

12. The printer of claim 11 further comprising:
a second proximity sensor supported by the housing and configured to sense movement of objects external to the housing and generate signals corresponding to positions of the objects with respect to the printer; and
the controller being operatively connected to the second proximity sensor, the controller being further configured to:
identify the degree of similarity between the identified path of movement for the object with reference to the plurality of signals generated by the first proximity sensor and another plurality of signals generated by the second proximity sensor, the second sensor being operatively connected to electrical power by the controller.

13. The printer of claim 12, the controller being further configured to:
store in the plurality of object paths in the memory data corresponding to the plurality of signals from the first sensor and the second sensor in association with data being received through the graphical display device in response to the graphical display device receiving data.

14. The printer of claim 12, the controller being further configured to:
detect that one degree of similarity between the identified path of movement for the object and a cluster of object paths that do not precede data being received through the graphical display device in a plurality of object paths stored in the memory exceeds the predetermined threshold; and
continue operation of the printer without operatively connecting the graphical display device in the printer and the at least one other component in the printer to electrical power in response to the controller detecting that the degree of similarity between the identified path of movement for the object and the cluster of object paths that does not precede data being received through the graphical display device exceeds the predetermined threshold.

15. The printer of claim 14, the controller being further configured to:
store in the plurality of object paths stored in the memory data corresponding to the plurality of signals from the first sensor and the second sensor in association with no data being received through the graphical display device in response to the graphical display device receiving no data within a predetermined time period following detection of the object with the controller.

16. The printer of claim 11, the print unit further comprising:
a fuser;
an electric heater operatively connected to the fuser; and
the controller being operatively connected to the electric heater and further configured to:
operatively connect the electric heater to electric power in response to the degree of similarity between the identified path of movement for the object and the cluster of object paths that precede data being received through the graphical display device exceeds the predetermined threshold.

17. The printer of claim 11, the print unit further comprising:
- an ink reservoir;
- an electric heater operatively connected to the ink reservoir; and
- the controller being operatively connected to the electric heater and further configured to:
  - operatively connect the electric heater to electric power in response to the degree of similarity between the identified path of movement for the object and the cluster of object paths that precede data being received through the graphical display device.

18. The printer of claim 11, the controller being further configured to:
- identify a previously performed operation of the printer with reference to operational history data stored in the memory;
- identify a first component in the print unit used in the previously performed operation;
- identify a second component in the print unit not used in the previously performed operation, the display device, the at least one other component, the first component, and the second component being different components; and
- operatively connect the first component to electrical power with the controller and leave the second component decoupled from electrical power.

19. The printer of claim 18 wherein the previously performed operation is a scanning operation, the first component is an optical scanner in the print unit, and the second component is a heater operatively connected to a fuser in the print unit.

20. The printer of claim 19 wherein the previously performed operation is a scanning operation, the first component is an optical scanner in the print unit, and the second component is a heater operatively connected to an ink reservoir in the print unit.

* * * * *